United States Patent [19]
Kawaguchi et al.

[11] Patent Number: 5,929,195
[45] Date of Patent: Jul. 27, 1999

[54] PROCESS FOR PRODUCING BRANCHED OR CROSSLINKED POLYACETAL RESIN

[75] Inventors: Kuniaki Kawaguchi; Kaoru Yamamoto; Hajime Serizawa, all of Fuji, Japan

[73] Assignee: Polyplastics Co., Ltd., Japan

[21] Appl. No.: 09/115,625

[22] Filed: Jul. 14, 1998

[30] Foreign Application Priority Data

Jul. 16, 1997 [JP] Japan ................................. 9-191269

[51] Int. Cl.⁶ .............................. C08G 4/00; C08G 6/00; C08G 10/02

[52] U.S. Cl. ...................... 528/233; 528/234; 528/238; 528/239; 528/240; 528/241; 528/242; 528/244; 528/245; 528/245.6; 528/249; 528/250

[58] Field of Search .................................. 528/233, 234, 528/238, 239, 240, 241, 242, 244, 245, 245.6, 249, 250

[56] References Cited

U.S. PATENT DOCUMENTS

| | | | |
|---|---|---|---|
| 3,980,734 | 9/1976 | Burg et al. | 260/860 |
| 4,169,867 | 10/1979 | Burg et al. | 525/417 |
| 4,225,703 | 9/1980 | Amann et al. | 528/480 |
| 4,493,751 | 1/1985 | Cherdron et al. | 162/157.2 |
| 4,828,755 | 5/1989 | Kusumgar et al. | 252/511 |
| 5,726,276 | 3/1998 | Nakai et al. | 528/234 |

*Primary Examiner*—Nathan M. Nutter
*Attorney, Agent, or Firm*—Nixon & Vanderhye P.C.

[57] ABSTRACT

A branched or crosslinked polyacetal resin is excellent in blow moldability, has impact resistances such as plane impact resistance, and the smoothness of the inner surfaces of moldings produced therefrom, and is suitable for molding, particularly blow molding. It can be produced by the bulk polymerization of (A) trioxane with (B) a cyclic ether and/or cyclic formal and (C) a polyfunctional glycidyl ether compound in the presence of (D) a cationic polymerization catalyst, a mixture prepared by mixing the cyclic ether and/or cyclic formal (B) with the polyfunctional glycidyl ether compound (C) and the cationic polymerization catalyst (D) is added to trioxane (A) to conduct the polymerization.

6 Claims, No Drawings

1

PROCESS FOR PRODUCING BRANCHED OR CROSSLINKED POLYACETAL RESIN

BACKGROUND OF THE INVENTION

1. Field of the Invention

This invention relates to a process for producing a branched or cross-linked polyacetal resin which excels in formability, particularly blow moldability, physical properties, and surface attributes.

2. Description of the Prior Art

The polyacetal resins exhibit mechanical quality, chemical resistance, and slidability in highly harmonious balance and enjoy ease of formation and, owing to these good features, find extensive utility as typical engineering plastics chiefly in electric/electronic parts, automobile parts, and other various machine parts. Most of them come in the form of injection molded articles.

In recent years, the expectation that the polyacetal resins, by virtue of their excellent resistance to chemicals, to organic solvents in particular, will find utility in applications to automobile fuel tanks, hollow components in engine rooms, or various containers has been gaining in prominence. The blow molding technique is generally used as the efficient means for producing such blow molded articles as mentioned above. It is held that for a resin to be effectively blow molded or extrusion molded, particularly to be blow molded, the exaltation of the melt tension of this resin generally constitutes itself an essential condition to an extent of protecting a parison of the resin against drawdown or preventing a blow molded article of the resin from sustaining a rupture or forming an uneven wall thickness while in process of production. For the sake of exalting the melt tension of a resin, measures for giving the resin a heightened molecular weight are generally adopted. In the case of such general-purpose resins as polyethylene which are used for blow molding, for example, those of the type having extremely high molecular weights are widely used.

The polyacetal resins generally excel in injection moldability. They, however, are blow molded with extreme difficulty because they exhibit such low melt tension to blow molding as suffers their parisons to induce the phenomenon of drawdown. Attempts to improve the blow moldability of a resin by devising a method of polymerization for giving the resin a heightened molecular weight are occasionally found as in JP-A 5-301271, for example. Since the polyacetal resins which have been made to acquire generously heightened molecular weights are markedly degraded in flowability, they are still deficient in blow moldability in spite of the improvement in liberation from the phenomenon of drawdown. The blow molded articles made of polyacetal resins having such high molecular weights and high degrees of viscosity as mentioned above are at a disadvantage in losing such impact resisting properties as surface impact strength ascribable to the orientation of resin.

In contrast, the polyacetal resins which have been made to form a branched or cross-linked structure tend to exhibit low degrees of viscosity in a state of high shear for their high molecular weights. For these polyacetal resins to reconcile an ample melt tension with flowability, however, they are required to add to their numbers of branches or cross-links. This addition, however, brings about the problem that the resins are deficient in impact resistance, the shaped articles of the resins are deficient in smoothness of inner surface, and the finished products of shaped articles are deficient in commercial value.

JP-A 7-195496 discloses compositions which are formed of polyacetal resin and thermoplastic polyurethane resin. These compositions are still improper because they seriously impair the inherent properties of polyacetal resin and, moreover, fail to exhibit stable productivity.

SUMMARY OF THE INVENTION

This invention, in the light of the true state of prior art mentioned above, has an object to provide a process for producing a branched or cross-linked polyacetal resin which combines such properties as melt tension, freedom from the phenomenon of drawdown, and flowability which are important for extrusion molding or blow molding, excels in blow moldability, excels in such impact resisting properties as surface impact strength, further excels in the smoothness of inner surface of a molded article of the resin, and therefore fits the purpose of forming, particularly blow molding.

The present inventors, as the result of a diligent study pursued with a view to accomplishing the object mentioned above, have found that the task aimed at is fulfilled by polymerizing a branched or cross-linked polyacetal resin under specific conditions. This invention has been completed on the basis of this knowledge.

That is, this invention is related to a process for producing a branched or cross-linked polyacetal resin by the bulk polymerization of (A) a trioxane with (B) a cyclic ether and/or a cyclic formal and (C) a polyfunctional glycidyl ether compound by the use of (D) a cationic polymerization catalyst, characterized by preparatorily mixing (B) the cyclic ether and/or the cyclic former with (C) the polyfunctional glycidyl ether compound and (D) the cationic polymerization catalyst and polymerizing (A) the trioxane while adding the resultant mixture thereto.

In other words, the invention provides a process for producing a branched or crosslinked polyacetal resin, which comprises the steps of bulk-polymerizing (A) trioxane with (B) at least one of a cyclic ether and cyclic formal, and (C) a polyfunctional glycidyl ether compound in the presence of (D) a cationic polymerization catalyst, a mixture of (B), (C) and (D) being added to trioxane (A) to conduct the polymerization.

DESCRIPTION OF PREFERRED EMBODIMENT OF THE INVENTION

Now, the process for producing a polyacetal resin according to this invention will be described below.

The polyacetal resin of the present invention is formed mainly of a branched or cross-linked polyacetal resin produced by polymerizing (A) a trioxane with (B) a cyclic ether and/or a cyclic formal and (C) a polyfunctional glycidyl ether compound by the use of (D) a cationic polymerization catalyst.

As concrete examples of (B) the cyclic ether and/or the cyclic formal to be used in this invention, ethylene oxide, propylene oxide, butylene oxide, epichlorohydrin, epibromohydrin, styrene oxide, oxetane, 3,3-bis (chloromethyl) oxetane, tetra-hydrofuran, trioxepane, 1,3-dioxolan, ethylene glycol formal, propylene glycol formal, diethylene glycol formal, triethylene glycol formal, 1,4-butane diol formal, 1,5-pentane diol formal, and 1,6-hexane diol formal may be cited. Among them, ethylene oxide, 1,3-dioxolan, diethylene glycol formal, and 1,4-butane diol formal prove to be preferable in particular. The amount of the cyclic ether and/or the cyclic formal to be used, either singly or in the form of a mixture of two or more members, is properly not more than 20 wt. %, particularly preferably not more than 15 wt. %, based on the amount of (A) the trioxane, with consideration for the rigidity, chemical resistance, etc. of a formed article to be made of the polyacetal resin of this invention.

The process of production according to this invention allows use of a component for adjusting a molecular weight besides the components mentioned above. The component for adjusting a molecular weight is, for example, a chain transfer agent which is incapable of forming an unstable terminal, i.e. one or more alkoxy group-containing compounds such as methylal, methoxy methylal, dimethoxy methylal, trimethoxy methylal, and oxymethylene di-n-butyl.

(C) The polyfunctional glycidyl ether compound according to this invention possesses at least two glycidyl groups in the molecular unit thereof. Among them, bifunctional glycidyl ether compounds prove to be particularly preferable. As concrete examples of the bifunctional glycidyl ether compound, ethylene glycol diglycidyl ether, propylene glycol diglycidyl ether, 1,4-butane diol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, and polybutylene glycol diglycidyl ether may be cited.

The amount of one member or a mixture of two or more members selected from among these compounds is properly in the range of 0.001 to 0.2 wt. %, particularly preferably in the range of 0.005 to 0.15 wt. %, based on the amount of (A) the trioxane. The amount of (C) the polyfunctional glycidyl ether compound contributes together with the amount of the component for adjusting the molecular weight to the adjustment of the shear viscosity of the polymer to be produced. If the amount thereof to be used is less than 0.001 wt. %, then the produced resin will acquire the inherent properties of branched or cross-linked polyacetal only with difficulty. If the amount is more than 0.2 wt. %, the produced resin will suffer from serious decline of formability because of unduly high shear viscosity. A deviation of this amount in either direction from the range specified above proves to be unfavorable.

As concrete examples of (D) the cationic polymerization catalyst to be used in this invention, lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride, boron trifluoride coordination compounds such as boron trifluoride diethyl etherate, boron trifluoride dibutyl etherate, boron trifluoride dioxanate, boron trifluoride acetic anhydrate, and boron trifluoride triethyl amine complex compound, inorganic and organic acids such as perchloric acid, acetyl perchlorate, t-butyl perchlorate, hydroxyacetic acid, trichloroacetic acid, trifluoroacetic acid, and p-toluenesulfonic acid, complex salt compounds such as triethyloxonium tetrafluoroborate, tiphenyl-methyl hexafluoroantimonate, allyldiazonium hexafluorophosphate, and allyldiazonium tetrafluoroborate, alkyl metal salts such as diethyl zinc, triethyl aluminum, and diethyl aluminum chloride, and heteropoly acids and isopoly acids may be cited. These catalysts are used either singly or in the form of a mixture of two or more members. Among the cationic polymerization catalysts mentioned above, boron trifluoride and such boron trifluoride coordination compounds as boron trifluoride diethyl etherate, boron trifluoride dibutyl etherate, boron trifluoride dioxanate, boron trifluoride acetic anhydrate, and boron trifluoride triethyl amine complex compound prove to be particularly favorable. (D) The cationic polymerization catalyst may be used in its unmodified form or may be used as diluted in advance with an organic solvent. It is not discriminated particularly on account of the method by which it is prepared for use. One member or a mixture of two or more members selected from among the compounds cited above is properly used in an amount in the range of 0.0001 to 0.1 wt. %, based on the amount of the trioxane.

The production of the polyacetal resin of this invention is implemented by the method of bulk polymerization which obtains a bulk of polymer of solid powder by mainly using (A) the trioxane in a liquefied form, (B) the cyclic ether and/or the cyclic formal, (C) the polyfunctional glycidyl ether compound, and (D) the cationic polymerization catalyst. The polymerization is not particularly restricted by the kind of device to be used but is carried out effectively by any of the known devices. It can be carried out batchwise or continuously, whichever better suits the occasion. The polymerization temperature is preferred to be maintained in the range of 65–135° C.

Here, the present invention, in producing the branched or cross-linked polyacetal resin by the bulk polymerization of (A) the trioxane with (B) the cyclic ether and/or the cyclic formal and (C) the polyfunctional glycidyl ether compound by virtue of (D) the cationic polymerization catalyst, employs a procedure which comprises preparatorily mixing (B) the cyclic ether and/or the cyclic former with (C) the polyfunctional glycidyl ether compound and (D) the cationic polymerization catalyst and then polymerizing (A) the trioxane while adding the resultant mixture thereto.

As concrete examples of this procedure, a method which comprises preparatorily mixing (B) the cyclic ether and/or the cyclic formal with (C) the polyfunctional glycidyl ether compound, then mixing them further with (D) the cationic polymerization catalyst, and polymerizing (A) the trioxane while adding the resultant mixture thereto and a method which comprises preparatorily mixing (B) the cyclic ether and/or the cyclic formal with (D) the cationic polymerization catalyst, then mixing them further with (C) the polyfunctional glycidyl ether compound, and polymerizing (A) the trioxane while adding the resultant mixture thereto may be cited.

In the action of mixing (B) the cyclic ether and/or the cyclic formal with (C) the polyfunctional glycidyl ether compound and the action of mixing the resultant mixture with (D) the cationic polymerization catalyst or the action of mixing (B) the cyclic ether and/or the cyclic formal with (D) the cationic polymerization catalyst and the action of mixing the resultant mixture with (C) the polyfunctional glycidyl ether compound, the method for effecting the action of mixing the relevant components is not restricted in any sense. For example, a method of continuously joining two components supplied each in the form of stream within a piping, a method of continuously joining two components supplied each in the form of stream and further mixing the resultant mixture by the use of a static mixer, a method of preparatorily mixing two components in a container provided with a stirrer and supplying the resultant mixture to the site of reaction, etc. may be cited.

In the action of mixing the components mentioned above, the mixing temperature and the mixing time are not particularly limited. When these factors are elected to be specified at all, the mixing temperature is preferred to be in the range of −70 to 150° C., particularly in the range of −50 to 70° C. and the mixing time is preferred to be in the range of 0.1 to 1200 seconds, particularly in the range of 0.5 to 600 seconds.

This invention is characterized in that the supply to (A) the trioxane of the rest of essential components is effected by preparatorily mixing (C) the polyfunctional glycidyl ether compound with (B) the cyclic ether and/or the cyclic formal and (D) the cationic polymerization catalyst and then polymerizing (A) the trioxane by adding the resultant mixture thereto. By using this method, it is made possible to obtain the branched or cross-linked polyacetal resin which exhibits perfect blow moldability and excels in such impact resisting properties as surface impact strength and in the smoothness of inner surface of a formed article made of the resin.

The inactivation of the system of polymerization is effected after the reaction of polymerization by adding a basic compound or an aqueous solution thereof to the reaction product which has been discharged from the polymerization device or which is still kept in the polymerization device. As concrete examples of the basic compound which is used for neutralizing and inactivating a polymerization catalyst, ammonia, amines such as triethyl amine, tributyl amine, triethanol amine, and tributanol amine, and hydroxides of alkali metals and alkaline earth metals, and other known catalyst inactivating agents may be cited. The product of the polymerization reaction is preferred to be inactivated by adding the aqueous solution thereto promptly after the completion of the reaction. The product resulting from the polymerization and inactivation effected by the methods described above, when necessary, is further washed for separation and recovery of the unaltered monomer and then dried in accordance with the conventional method. The refined polymer, as occasion demands, is further subjected to a stabilizing treatment aimed at incorporating a varying necessary stabilizing agent therein by the known method such as, for example, the removal of an unstable terminal part through decomposition or the sealing of an unstable terminal with a stabilizing substance. The stabilizer to be used herein may be one member or a mixture of two or more members selected arbitrarily from among hindered phenol type compounds, nitrogen-containing compounds, hydroxides of alkali or alkaline earth metals, inorganic salts, and carboxylates. The produced polymer, when necessary, may incorporate therein one member or a mixture of two or more members selected arbitrarily from among standard additives for thermoplastic resins such as, for example, coloring agents like dyes and pigments, slip additive, seeds, mold release agent, antistatic agent, surfactant, organic macromolecular material, and inorganic or organic fillers shaped like fibers, particles, or ribbons on the condition that the incorporation brings about no detrimental effect on the invention.

The production of a blow molded article by blow molding the polyacetal resin composition of this invention mentioned above may be effected by using the molding device generally adopted for blow molding a thermoplastic resin and following the heretofore known method with necessary modifications. Specifically, the blow molded article is obtained by preparing pellets of the polyacetal resin composition, plasticizing the pellets with an extruding device or injection molding device, extruding the plasticized pellets through an annular die or injecting them thereby forming an annular molten or softened parison, nipping the parison between matched metal dies, blowing a gas into the die cavity holding the parison thereby inflating the parison, and cooling and solidifying the inflated parison. This method is particularly suitable for the production of a large blow molded article. As respects the conditions of blow molding, the cylinder temperature and the die temperature are properly in the range of 180 to 250° C., particularly in the range of 190 to 220° C. Then the mold temperature is preferably in the range of 40 to 140° C., particularly in the range of 50 to 120° C. The gas to be blown into the mold cavity may be air, nitrogen, or any of the other gases. By reason of economy, however, air is generally used for this purpose. It is allowable to use such a special molding device as a three-dimensional blow molding device. The polyacetal resin composition of this invention may be blow molded in two or more layers including layers of such other materials as polyolefin, polyester, and polyamide resin.

By using the process of the present invention for producing a polyacetal resin, it is made possible to obtain a polyacetal resin which combines such properties as melt tension, freedom from the phenomenon of drawdown, and flowability which are important for blow molding, excels in blow moldability, excels in such impact resisting properties as surface impact strength, and further excels in the smoothness of inner surface of a molded article of the resin. The polyacetal resin which is obtained by the process of production according to this invention possesses highly satisfactory mechanical properties and chemical resistance and, therefore, finds extensive utility in applications to automobile fuel tanks, blow molded components in engine rooms, containers, pipes and other piping materials, and various industrial articles.

EXAMPLES

Now, this invention will be described more specifically below with reference to working examples. It should be noted, however, that this invention is not limited to these examples.

Example 1

To a continuous mixing reactor provided externally with a jacket for passing a heat medium (coolant) and constructed with a barrel of a cross section shaped like two partially overlapping circles and two rotary shafts fitted with paddles, trioxane having methylal contained therein as a molecular weight adjusting agent in a concentration of 0.05 wt. % (based on the amount of trioxane) was continuously supplied through one end thereof with the two rotary shafts kept rotated in mutually different directions at a speed of 150 rpm.

In a piping, streams of 3.3 wt. % of 1,3-dioxolan and 0.03 wt. % of 1,4-butane diol diglycidyl ether (both based on the amount of trioxane) were continuously joined and mixed. The joined stream and a steam of 0.003 wt. % of boron trifluoride (based on the amount of trioxane) were joined and mixed in a static mixer. The total duration of mixing was 5 seconds. The resultant mixture (cooled to $-5°$ C.) was continuously supplied to the reactor to effect bulk polymerization of the monomer therein. The reaction product discharged through the outlet of the reactor was immediately passed through a crusher and added to an aqueous solution containing triethyl amine in a concentration of 0.05 wt. % and kept at 60° C. to effect pulverization of particles and inactivate the catalyst. It was further separated, washed, and dried to afford a crude polyacetal resin. Then, in a Henschel mixer, 100 parts by weight of the crude polyacetal resin and 0.3 part by weight of pentaerythrityl-tetrakis[3-(3,5-di-tert-butyl-4-hydroxyphenyl)propionate, "Irganox 1010" (trademark), made by Ciba Geigy, and 0.15 part by weight of melamine added as stabilizers thereto were mixed. The resultant mixture was melted and kneaded at 200° C. in a biaxial extruder fitted with a vent to stabilize the system and afford a branched or cross-linked polyacetal resin [melt index 1.0 g/10 min. determined (in accordance with ASTM D1238) at a temperature of 190° C. under a load of 2.16 kg] in the shape of pellets.

The resin thus obtained was processed with a blow molder, "S-45ND"(trademark), made by PURAKOO K.K., under the conditions of 200° C. of cylinder temperature, 200° C. of die temperature, 80° C. of metal mold temperature, 5 kg/cm² of blow pressure, 50 mm of die diameter, and 2.5 mm of die clearance to manufacture a boxlike hollow container measuring 50×80×100 (mm). This hollow container was rated for blow moldability (proofness against drawdown and melt fracture), surface impact strength, and smoothness of the inner surface of a container by the following methods. The results are shown in Table 1.

The methods used for this rating were as follows.

(1) Blow moldability (proofness against drawdown and melt fracture)

The durations required by a sample parison to fall to 120 mm and to 600 mm during the process of blow molding were clocked and the ratio of these durations (drawdown index) was used for rating the blow moldability. The resin was discharged at a speed of 400 g/min. The magnitude of this index grew in proportion as the difficulty with which the parison yielded to the phenomenon of drawdown increased and the grade of blow moldability rose. The flowability of the parison was rated, depending on the presence or absence of the occurrence of melt fracture in the parison.

(2) Surface impact strength

This property was determined by the use of an instrument, "DAINATAPPU 8250"(trademark), made by General Research K.K., adapted to drop a weight of 5.7 kg having a hemispheric end having a diameter of 40 mm, from a height of 90 cm onto a flat plate sample, 70×70 (mm), cut from a given boxlike blow molded article obtained in working example and comparative example and register an energy curve during the fracture of the sample. The maximum load (in kN/mm) found from the energy curve was reported as the surface impact strength.

(3) Smoothness of inner surface of blow molded article

A boxlike blow molded container obtained in a given working example or comparative example was cut and the inner surface of the cut container was visually examined for smoothness. The smoothness was rated on a four-point scale using the ranks called excellent, fine, rather bad, and bad.

Examples 2 and 3

Branched or cross-linked polyacetal resins (melt index 1.4 g/10 min. in Example 2 and 0.8 g/10 min. in Example 3) in the shape of pellets were obtained by following the procedure of Example 1 while changing the amount of 1,4-butane diol diglycidyl ether (to 0.02 wt. % in example 2 and 0.04 wt. % in Example 3, both based on the amount of trioxane) and blow molded to produce boxlike hollow containers. The containers were rated in the same manner as in Example 1. The results are shown in Table 1.

Example 4

To the same continuous mixing reactor as used in Example 1, trioxane containing methylal in a concentration of 0.05 wt. % (based on the amount of trioxane) was continuously supplied through one end thereof.

Subsequently, streams of 3.3 wt. % of 1,3-dioxolan and 0.003 wt. % of boron trifluoride (both based on the amount of trioxane) were continuously joined in a piping and mixed by means of a static mixer. The resultant joined stream and a steam of 0.03 wt. % of 1,4-butane diol diglycidyl ether (based on the amount of trioxane) were joined and mixed in the piping. The total duration of mixing was 5 seconds. The resultant mixture (cooled to −5° C.) was continuously supplied to the reactor to effect bulk polymerization of the monomer therein.

The reaction product discharged through the outlet of the reactor was processed in the same manner as in Example 1 to obtain a branched or cross-linked polyacetal resin (melt index 0.9 g/10 min.). This resin was blow molded to manufacture a boxlike hollow container and this container was rated. The results are shown in Table 1.

Comparative Example 1

To the same continuous mixing reactor as used in Example 1, trioxane containing 0.05 wt. % of methylal and 0.003 wt. % of 1,4-butane diol diglycidyl ether (both based on the amount of trioxane) was continuously supplied through one end thereof.

Subsequently, streams of 3.3 wt. % of 1,3-dioxolan and 0.03 wt. % of boron trifluoride (both based on the amount of trioxane) were continuously joined in a piping and mixed by means of a static mixer. The total duration of mixing was 5 seconds. The resultant mixture (cooled to −5° C.) was continuously supplied to the reactor to effect bulk polymerization of the monomer therein.

The reaction product discharged through the outlet of the reactor was processed in the same manner as in Example 1 to obtain a branched or cross-linked polyacetal resin (melt index 1.3 g/10 min.). This resin was blow molded to manufacture a boxlike hollow container and this container was rated for blow moldability. The results are shown in Table 1.

Comparative Example 2

To the same continuous mixing reactor as used in Example 1, trioxane containing 3.3 wt. % of 1,3-dioxolan, 0.05 wt. % of methylal, and 0.03 wt. % of 1,4-butane diol diglycidyl ether (invariably based on the amount of trioxane) was continuously supplied through one end thereof. Subsequently, 0.003 wt. % of boron trifluoride (based on the amount of trioxane) was supplied continuously to the reactor to effect bulk polymerization of the monomer therein.

The reaction product discharged through the outlet of the reactor was processed in the same manner as in Example 1 to produce a branched or cross-linked polyacetal resin (melt index 1.4 g/10 min.) in the shape of pellets. The resin was further blow molded to obtain a boxlike hollow container. This container was rated for blow moldability. The results are shown in Table 1.

Comparative Example 3

To the same continuous mixing reactor as used in Example 1, trioxane containing 3.3 wt. % of 1,3-dioxolan, 0.05 wt. % of methylal, and 0.23 wt. % of 1,4-butane diol diglycidyl ether (invariably based on the amount of trioxane) was continuously supplied through one end thereof. Subsequently, 0.003 wt. % of boron trifluoride (based on the amount of trioxane) was supplied continuously to the reactor to effect bulk polymerization of the monomer therein.

The reaction product discharged through the outlet of the reactor was processed in the same manner as in Example 1 to produce a branched or cross-linked polyacetal resin (melt index 0.5 g/10 min.) in the shape of pellets. The resin was further blow molded to obtain a boxlike hollow container. This container was rated for blow moldability. The results are shown in Table 1.

Comparative Example 4

To the same continuous mixing reactor as used in Example 1, trioxane containing 3.3 wt. % of 1,3-dioxolan and 0.005 wt. % of methylal (both based on the amount of trioxane) was continuously supplied through one end thereof. Subsequently, 0.003 wt. % of boron trifluoride (based on the amount of trioxane) was supplied continuously to the reactor to effect bulk polymerization of the monomer therein.

The reaction product discharged through the outlet of the reactor was processed in the same manner as in Example 1 to produce a linear polyacetal resin (melt index 0.2 g/10 min.) in the shape of pellets. The resin was further blow molded to obtain a boxlike hollow container. This container was rated for blow moldability. The results are shown in Table 1.

TABLE 1

| | Blow moldability | | | |
|---|---|---|---|---|
| | Drawdown index | Presence or absence of melt fracture | Surface impact strength (maximum load) [kN/mm] | Smoothness of inner surface of molded article |
| Ex. 1 | 3.6 | Absence | 1.34 | Excellent |
| Ex. 2 | 3.4 | Absence | 1.33 | Excellent |
| Ex. 3 | 3.8 | Absence | 1.30 | Excellent |
| Ex. 4 | 3.7 | Absence | 1.35 | Excellent |
| Com. Ex. 1 | 2.1 | Absence | 0.80 | Rather bad |
| Com. Ex. 2 | 2.0 | Absence | 0.82 | Rather bad |
| Com. Ex. 3 | 3.7 | Absence | 0.47 | Bad* |
| Com. Ex. 4 | 3.6 | Presence | 0.40 | Rather bad |

●Spots appeared conspicuously

We claim:

1. A process for producing a branched or crosslinked polyacetal resin, which comprises bulk-polymerizing (A) trioxane with (B) at least one of a cyclic ether and cyclic formal, and (C) a polyfunctional glycidyl ether compound in the presence of (D) a cationic polymerization catalyst, wherein prior to said bulk-polymerization, there includes the step of forming a preparatory mixture of components (B), (C) and (D), and thereafter adding the preparatory mixture to the trioxane component (A) to conduct the bulk-polymerization.

2. The process according to claim 1, which comprises forming an initial mixture of at least one of the cyclic ether and cyclic formal (B) with the polyfunctional glycidyl ether compound (C), and then mixing the resultant initial mixture with the cationic polymerization catalyst (D) to form the preparatory mixture which is then added to the trioxane (A) to conduct the bulk-polymerization.

3. The process according to claim 1, which comprises forming an initial mixture of at least one of the cyclic ether and cyclic formal (B) with the cationic polymerization catalyst (D), and then mixing the resultant initial mixture with the polyfunctional glycidyl ether compound (C) to form the preparatory mixture which is then added to the trioxane (A) to conduct the bulk-polymerization.

4. The process according to claim 1, wherein the cationic polymerization catalyst (D) is at least one member selected from the group consisting of boron trifluoride and boron trifluoride coordination compounds.

5. The process according to claim 1, wherein the cyclic ether and cyclic formal (B) is at least one member selected from the group consisting of ethylene oxide, 1,3-dioxolane, diethylene glycol formal and 1,4-butanediol formal.

6. The process according to claim 1, wherein the polyfunctional glycidyl ether compound (C) is a diglycidyl ether compound.

* * * * *